United States Patent
Zhu et al.

(10) Patent No.: US 11,693,567 B2
(45) Date of Patent: Jul. 4, 2023

(54) MEMORY PERFORMANCE OPTIMIZATION METHOD, MEMORY CONTROL CIRCUIT UNIT AND MEMORY STORAGE DEVICE

(71) Applicant: Hefei Core Storage Electronic Limited, Anhui (CN)

(72) Inventors: Qi-Ao Zhu, Anhui (CN); Jing Zhang, Anhui (CN); Kuai Cao, Anhui (CN); Xin Wang, Anhui (CN); Xu Hui Cheng, Anhui (CN); Dong Sheng Rao, Hefei (CN)

(73) Assignee: Hefei Core Storage Electronic Limited, Anhui (CN)

( * ) Notice: Subject to any disclaimer, the term of this patent is extended or adjusted under 35 U.S.C. 154(b) by 0 days.

(21) Appl. No.: 17/533,020

(22) Filed: Nov. 22, 2021

(65) Prior Publication Data
US 2023/0127512 A1    Apr. 27, 2023

(30) Foreign Application Priority Data
Oct. 22, 2021    (CN) .......................... 202111231508.9

(51) Int. Cl.
*G06F 3/06*       (2006.01)
*G06F 1/3287*     (2019.01)
(Continued)

(52) U.S. Cl.
CPC .......... *G06F 3/0625* (2013.01); *G06F 1/3275* (2013.01); *G06F 1/3287* (2013.01);
(Continued)

(58) Field of Classification Search
CPC .... G06F 3/0625; G06F 3/0634; G06F 3/0653; G06F 3/0656; G06F 3/0659;
(Continued)

(56) References Cited

U.S. PATENT DOCUMENTS

| 2009/0172499 A1* | 7/2009 | Olbrich ................. G06F 3/0604 714/773 |
| 2012/0226927 A1* | 9/2012 | Kagan ................... G06F 1/3225 713/323 |

(Continued)

FOREIGN PATENT DOCUMENTS

| CN | 102012736 | 4/2011 |
| CN | 104345868 | 2/2015 |

(Continued)

OTHER PUBLICATIONS

Fu, Chenchen, et al. "Maximizing common idle time on multicore processors with shared memory." IEEE Transactions on Very Large Scale Integration (VLSI) Systems 25.7 (2017): 2095-2108. (Year: 2017).*

(Continued)

*Primary Examiner* — Nicholas J Simonetti
(74) *Attorney, Agent, or Firm* — JCIPRNET

(57) ABSTRACT

A memory performance optimization method, a memory control circuit unit, and a memory storage device are provided. The method includes the following. An idle time of the memory storage device is counted in an active mode. The memory storage device is instructed to enter a first low electricity consumption mode from the active mode in response to the idle time being greater than an idle threshold. A first waiting time of the memory storage device is counted in the first low electricity consumption mode. The memory storage device is instructed to enter a second low electricity consumption mode from the first low electricity consumption mode in response to the first waiting time being greater than a first waiting threshold. Electricity consumption of the second low electricity consumption mode is lower than electricity consumption of the first low electricity consumption mode.

12 Claims, 9 Drawing Sheets

(51) Int. Cl.
    *G06F 13/16* (2006.01)
    *G06F 1/3234* (2019.01)
(52) U.S. Cl.
    CPC .......... *G06F 3/0634* (2013.01); *G06F 3/0653* (2013.01); *G06F 3/0656* (2013.01); *G06F 3/0659* (2013.01); *G06F 3/0679* (2013.01); *G06F 13/1668* (2013.01)
(58) Field of Classification Search
    CPC .... G06F 3/0679; G06F 1/3275; G06F 1/3287; G06F 13/1668
    See application file for complete search history.

(56) References Cited

U.S. PATENT DOCUMENTS

| | | | |
|---|---|---|---|
| 2017/0285989 A1* | 10/2017 | Lai | G06F 3/0688 |
| 2020/0201417 A1 | 6/2020 | Park et al. | |
| 2020/0201418 A1 | 6/2020 | Richter | |
| 2021/0011630 A1* | 1/2021 | Zhu | G06F 13/1689 |
| 2021/0018975 A1* | 1/2021 | Liang | G06F 1/28 |
| 2022/0300061 A1* | 9/2022 | He | G06F 1/3225 |

FOREIGN PATENT DOCUMENTS

| | | |
|---|---|---|
| CN | 107766006 | 3/2018 |
| CN | 108008805 | 5/2018 |
| CN | 110333770 | 10/2019 |
| CN | 110727397 | 1/2020 |
| CN | 111026325 | 4/2020 |
| TW | I648634 | 1/2019 |
| TW | I680458 | 12/2019 |

OTHER PUBLICATIONS

"Office Action of Taiwan Counterpart Application", dated Oct. 18, 2022, p. 1-p. 5.
"Office Action of China Counterpart Application", dated Apr. 28, 2023, p. 1-p. 8.

* cited by examiner

MEMORY PERFORMANCE OPTIMIZATION METHOD, MEMORY CONTROL CIRCUIT UNIT AND MEMORY STORAGE DEVICE

CROSS-REFERENCE TO RELATED APPLICATION

This application claims the priority benefit of China application serial no. 202111231508.9, filed on Oct. 22, 2021. The entirety of the above-mentioned patent application is hereby incorporated by reference herein and made a part of this specification.

BACKGROUND

Technical Field

The disclosure relates to a memory management technology, in particular to a memory performance optimization method, a memory control circuit unit, and a memory storage device.

Description of Related Art

The rapid growth of digital cameras, mobile phones and MP3 players in the past few years has led to a rapid increase in consumer demand for storage media. Since rewritable non-volatile memory modules (e.g., flash memory) are non-volatile, power efficient, small in size, and non-mechanical, they are well suited to be built into the various portable multimedia devices mentioned above.

Generally, when a memory storage device is idle for a period of time, it will enter idle mode to save power and/or perform some background operations. However, the electricity consumption of the memory storage device in idle mode is higher, which will unnecessarily increase the power consumption. Therefore, how to reduce the power consumption of memory storage devices is a topic for those skilled in the art.

SUMMARY

The disclosure provides a memory performance optimization method, a memory control circuit unit, and a memory storage device, capable of improving the above problems.

An exemplary embodiment of the disclosure provides a memory performance optimization method for a memory storage device. The memory storage device includes a memory control circuit unit and a rewritable non-volatile memory module. The memory control circuit unit includes a buffer memory. The method includes the following. An idle time of the memory storage device is counted in an active mode. The memory storage device is instructed to enter a first low electricity consumption mode from the active mode in response to the idle time being greater than an idle threshold. A first waiting time of the memory storage device is counted in the first low electricity consumption mode. The memory storage device is instructed to enter a second low electricity consumption mode from the first low electricity consumption mode in response to the first waiting time being greater than a first waiting threshold. Electricity consumption of the second low electricity consumption mode is lower than electricity consumption of the first low electricity consumption mode.

According to an embodiment of the disclosure, the step of instructing the memory storage device to enter the first low electricity consumption mode from the active mode includes the following. A program code and data other than a logical-physical address mapping table temporarily stored in the buffer memory are stored back to the rewritable non-volatile memory module, and power of the rewritable non-volatile memory module is disconnected.

According to an embodiment of the disclosure, the step of instructing the memory storage device to enter the second low electricity consumption mode from the first low electricity consumption mode includes the following. All data temporarily stored in the buffer memory is stored back to the rewritable non-volatile memory module, and power of the rewritable non-volatile memory module and the buffer memory is disconnected.

According to an embodiment of the disclosure, the method further includes the following. A second waiting time of the memory storage device is counted in the first low electricity consumption mode in response to a condition for performing a background operation being met. The memory storage device is instructed to enter a background mode from the first low electricity consumption mode in response to the second waiting time being greater than a second waiting threshold. The memory storage device is instructed to enter the first low electricity consumption mode from the background mode after the background operation being performed, and a third waiting time of the memory storage device is counted in the first low electricity consumption mode. The memory storage device is instructed to enter the second low electricity consumption mode from the first low electricity consumption mode in response to the third waiting time being greater than a third waiting threshold.

According to an embodiment of the disclosure, the second waiting threshold is less than the first waiting threshold.

According to an embodiment of the disclosure, the third waiting threshold is equal to the first waiting threshold minus the second waiting threshold.

An exemplary embodiment of the disclosure provides a memory control circuit unit for controlling a memory storage device including a rewritable non-volatile memory module. The memory control circuit unit includes a host interface, a memory interface, a buffer memory, and a memory management circuit. The host interface is configured to couple to a host system. The memory interface is configured to couple to the rewritable non-volatile memory module. The memory management circuit is coupled to the host interface, the memory interface, and the buffer memory. The memory management circuit is configured to count an idle time of the memory storage device in an active mode. The memory management circuit is further configured to instruct the memory storage device to enter a first low electricity consumption mode from the active mode in response to the idle time being greater than an idle threshold. The memory management circuit is further configured to count a first waiting time of the memory storage device in the first low electricity consumption mode. Moreover, the memory management circuit is further configured to instruct the memory storage device to enter a second low electricity consumption mode from the first low electricity consumption mode in response to the first waiting time being greater than a first waiting threshold. Electricity consumption of the second low electricity consumption mode is lower than electricity consumption of the first low electricity consumption mode.

According to an embodiment of the disclosure, in an operation of instructing the memory storage device to enter the first low electricity consumption mode from the active mode, the memory management circuit is further configured to store back to the rewritable non-volatile memory module a program code and data other than a logical-physical address mapping table temporarily stored in the buffer memory, and disconnect power of the rewritable non-volatile memory module.

According to an embodiment of the disclosure, in an operation of instructing the memory storage device to enter the second low electricity consumption mode from the first low electricity consumption mode, the memory management circuit is further configured to store back to the rewritable non-volatile memory module all data temporarily stored in the buffer memory, and disconnect power of the rewritable non-volatile memory module and the buffer memory.

According to an embodiment of the disclosure, the memory management circuit is further configured to: count a second waiting time of the memory storage device in the first low electricity consumption mode in response to a condition for performing a background operation being met; instruct the memory storage device to enter a background mode from the first low electricity consumption mode in response to the second waiting time being greater than a second waiting threshold; instruct the memory storage device to enter the first low electricity consumption mode from the background mode after the background operation being performed, count a third waiting time of the memory storage device in the first low electricity consumption mode; and instruct the memory storage device to enter the second low electricity consumption mode from the first low electricity consumption mode in response to the third waiting time being greater than a third waiting threshold.

According to an embodiment of the disclosure, the second waiting threshold is less than the first waiting threshold.

According to an embodiment of the disclosure, the third waiting threshold is equal to the first waiting threshold minus the second waiting threshold.

An exemplary embodiment of the disclosure provides a memory storage device including a connection interface unit, a rewritable non-volatile memory module, and a memory control circuit unit. The connection interface unit is configured to couple to a host system. The memory control circuit unit is coupled to the connection interface unit and the rewritable non-volatile memory module. The memory control circuit unit includes a buffer memory. The memory control circuit unit is configured to count an idle time of the memory storage device in an active mode. The memory control circuit unit is further configured to instruct the memory storage device to enter a first low electricity consumption mode from the active mode in response to the idle time being greater than an idle threshold. The memory control circuit unit is further configured to count a first waiting time of the memory storage device in the first low electricity consumption mode. Moreover, the memory control circuit unit is further configured to instruct the memory storage device to enter a second low electricity consumption mode from the first low electricity consumption mode in response to the first waiting time being greater than a first waiting threshold. Electricity consumption of the second low electricity consumption mode is lower than electricity consumption of the first low electricity consumption mode.

According to an embodiment of the disclosure, in an operation of instructing the memory storage device to enter the first low electricity consumption mode from the active mode, the memory control circuit unit is further configured to store back to the rewritable non-volatile memory module a program code and data other than a logical-physical address mapping table temporarily stored in the buffer memory, and disconnect power of the rewritable non-volatile memory module.

According to an embodiment of the disclosure, in an operation of instructing the memory storage device to enter the second low electricity consumption mode from the first low electricity consumption mode, the memory control circuit unit is further configured to store back to the rewritable non-volatile memory module all data temporarily stored in the buffer memory, and disconnect power of the rewritable non-volatile memory module and the buffer memory.

According to an embodiment of the disclosure, the memory control circuit unit is further configured to: count a second waiting time of the memory storage device in the first low electricity consumption mode in response to a condition for performing a background operation being met; instruct the memory storage device to enter a background mode from the first low electricity consumption mode in response to the second waiting time being greater than a second waiting threshold; instruct the memory storage device to enter the first low electricity consumption mode from the background mode after the background operation being performed, and count a third waiting time of the memory storage device in the first low electricity consumption mode; and instruct the memory storage device to enter the second low electricity consumption mode from the first low electricity consumption mode in response to the third waiting time being greater than a third waiting threshold.

According to an embodiment of the disclosure, the second waiting threshold is less than the first waiting threshold.

According to an embodiment of the disclosure, the third waiting threshold is equal to the first waiting threshold minus the second waiting threshold.

Based on the above, the memory performance optimization method, the memory control circuit unit, and the memory storage device provided by the embodiments of the disclosure are configured with low electricity consumption modes with different electricity consumption. In a first level of the low electricity consumption mode, the buffer memory still temporarily holds necessary data and may respond quickly to host requirements while reducing power consumption of the memory storage device. In a second level of the low electricity consumption mode, the memory storage device consumes less power and may be more energy efficient. Based on different levels of low electricity consumption mode, the memory storage device may better balance power savings with system performance.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

In general, a memory storage device (also known as a memory storage system) includes a rewritable non-volatile memory module and a controller (also known as a control circuit). A memory storage device is usually used with a host system to enable the host system to write data to and read data from the memory storage device.

Figure 1:
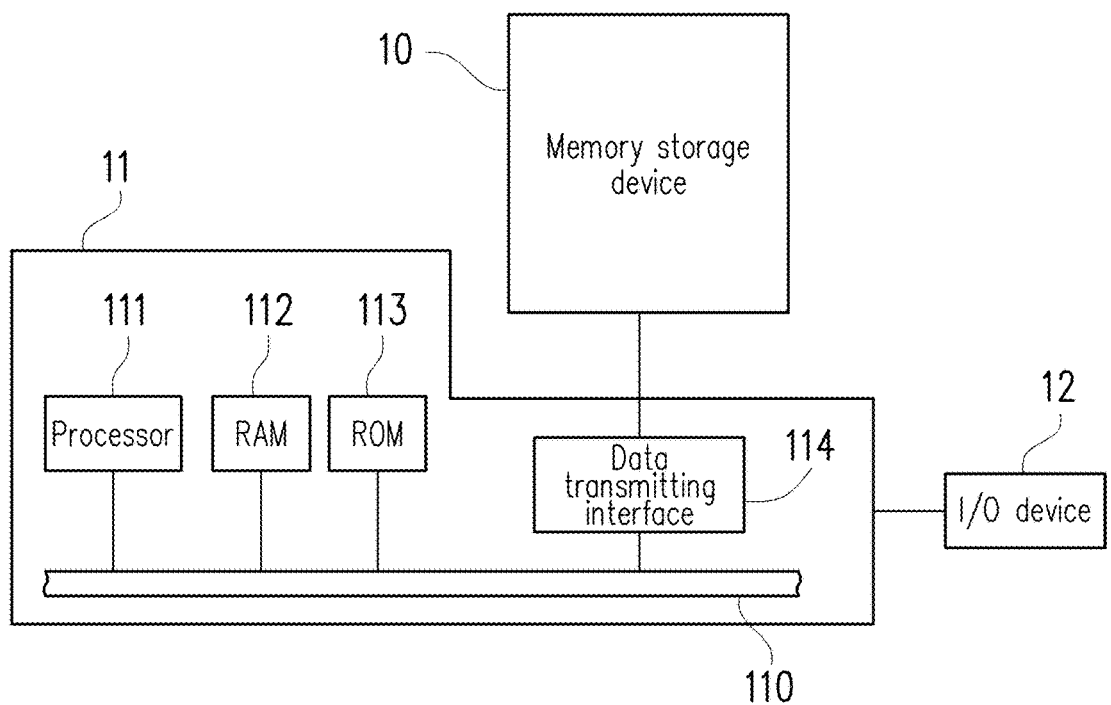
FIG. 1 is a schematic diagram of a host system, a memory storage device, and an input/output (I/O) device according to an exemplary embodiment of the disclosure.
Figure 2:
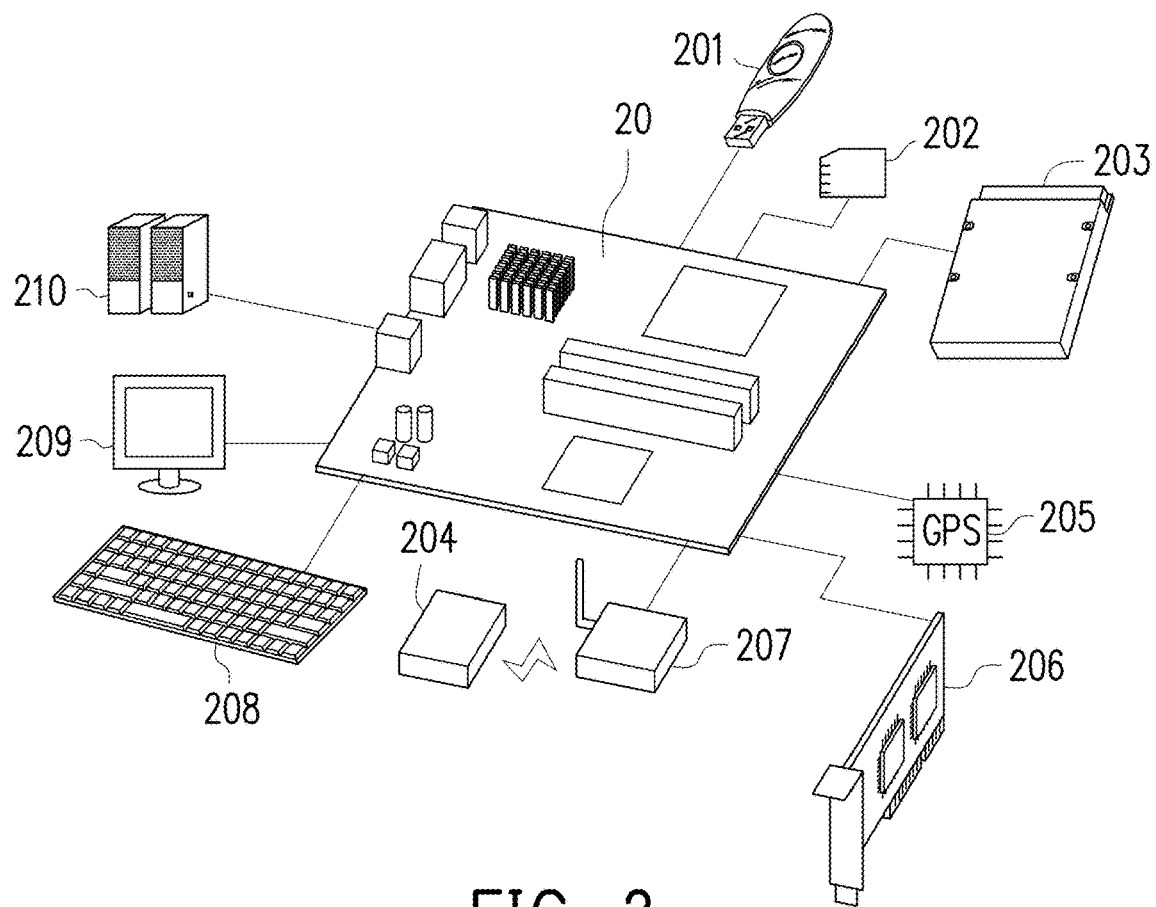
FIG. 2 is a schematic diagram of a host system, a memory storage device, and an I/O device according to another exemplary embodiment of the disclosure.

FIG. 1 is a schematic diagram of a host system, a memory storage device, and an input/output (I/O) device according to an exemplary embodiment of the disclosure. FIG. 2 is a schematic diagram of a host system, a memory storage device, and an I/O device according to another exemplary embodiment of the disclosure.

Referring to FIG. 1 and FIG. 2, a host system 11 generally includes a processor 111, a random access memory (RAM) 112, a read only memory (ROM) 113, and a data transmitting interface 114. The processor 111, the random access memory 112, the read only memory 113, and the data transmitting interface 114 are all coupled a system bus 110.

According to this exemplary embodiment, the host system 11 is coupled to a memory storage device 10 through the data transmitting interface 114. For example, the host system 11 may store data to the memory storage device 10 or read data from the memory storage device 10 through the data transmitting interface 114. In addition, the host system 11 is coupled to an I/O device 12 through the system bus 110. For example, the host system 11 may transmit an output signal to the I/O device 12 or receive an input signal from the I/O device 12 through the system bus 110.

According to this exemplary embodiment, the processor 111, the random access memory 112, the read only memory 113, and the data transmitting interface 114 may be disposed on a motherboard 20 of the host system 11. A number of the data transmitting interface 114 may be one or more. Through the data transmitting interface 114, the motherboard 20 may be coupled to the memory storage device 10 by wired or wireless means. The memory storage device 10 may be, for example, a USB flash drive 201, a memory card 202, a solid state drive (SSD) 203, or a wireless memory storage device 204. The wireless memory storage device 204 may be, for example, a Near Field Communication (NFC) memory storage device, a wireless fax (Wi-Fi) memory storage device, a Bluetooth memory storage device, or a low power consumption Bluetooth memory storage device (e.g., iBeacon) and other memory storage devices based on various wireless communication technologies. In addition, the motherboard 20 may also be coupled to various I/O devices such as a Global Positioning System (GPS) module 205, a network interface card 206, a wireless transmitting device 207, a keyboard 208, a monitor 209, and a speaker 210 through the system bus 110. For example, according to an exemplary embodiment, the motherboard 20 may access the wireless memory storage device 204 through the wireless transmitting device 207.

Figure 3:
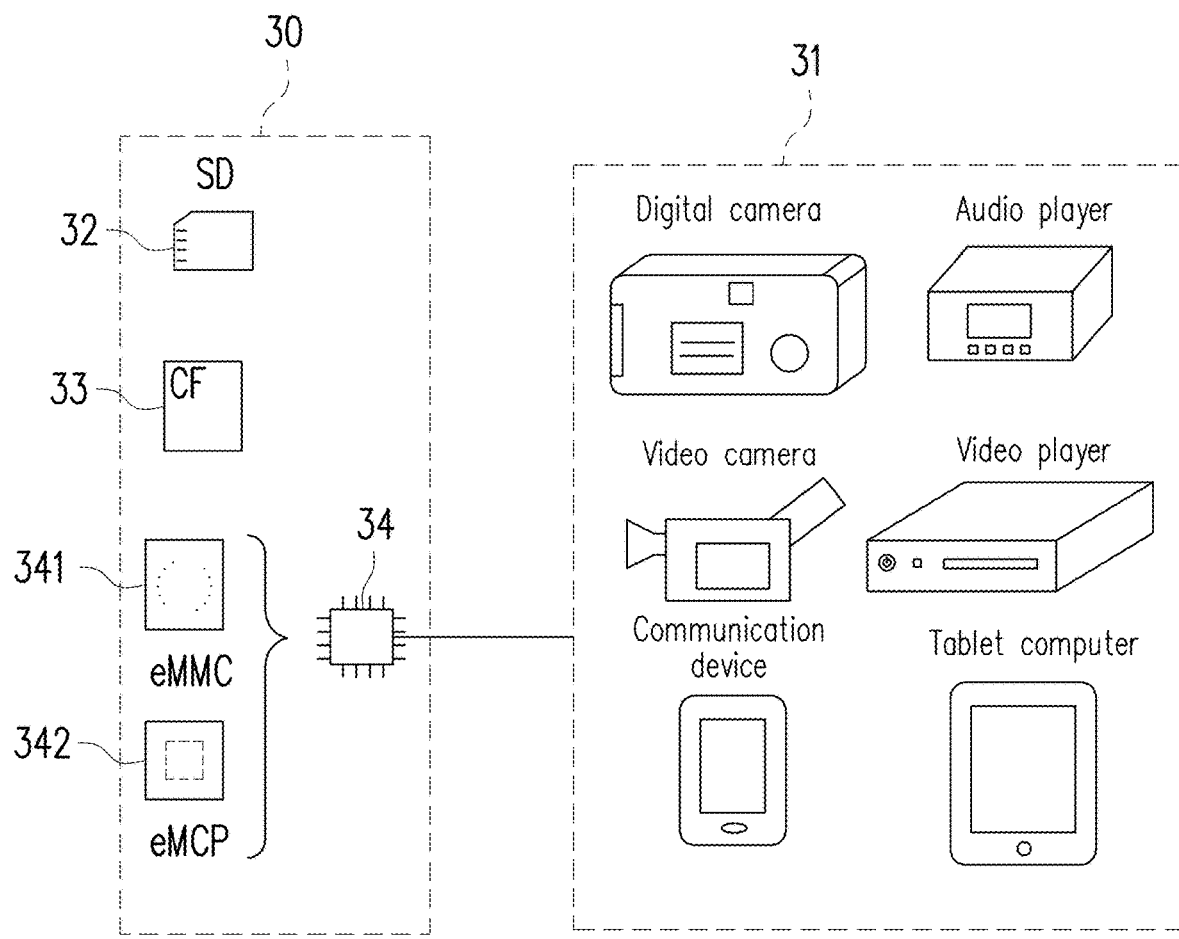
FIG. 3 is a schematic diagram of a host system and a memory storage device according to another exemplary embodiment of the disclosure.

According to an exemplary embodiment, the host system referred to is any system capable of physically working with a memory storage device to store data. Although according to the exemplary embodiment, the host system is illustrated by a computer system; however, FIG. 3 is a schematic diagram of a host system and a memory storage device according to another exemplary embodiment of the disclosure. Referring to FIG. 3, according to another exemplary embodiment, a host system 31 may also be a digital camera, video camera, communication device, audio player, video player, tablet computer, or other system, and the memory storage device 30 may be a variety of non-volatile memory storage devices such as a Secure Digital (SD) card 32, a Compact Flash (CF) card 33, or an embedded storage device 34 used for the host system 31. The embedded storage device 34 includes an embedded Multi Media Card (eMMC) 341 and/or an embedded Multi Chip Package (eMCP) storage device 342 and other types of embedded storage devices in which memory modules are coupled directly to a substrate of the host system.

Figure 4:
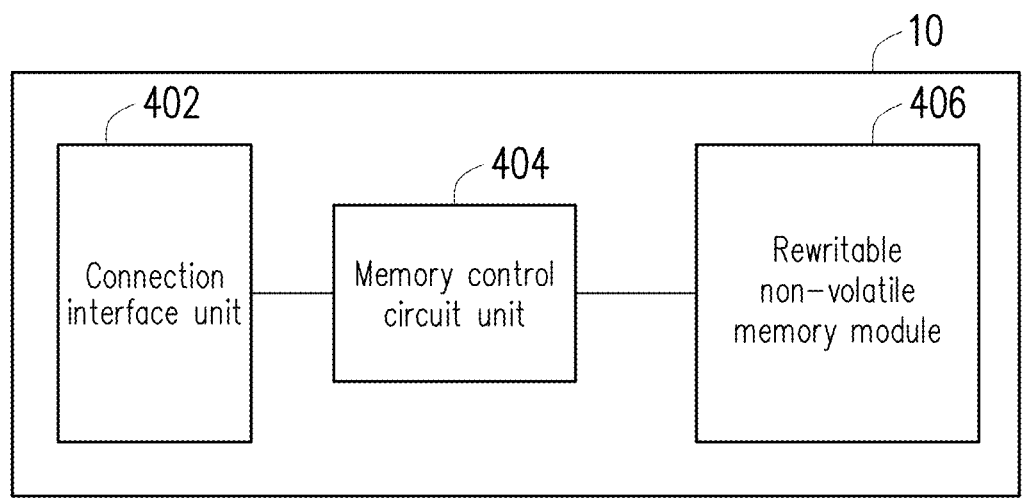
FIG. 4 is a schematic block diagram of a memory storage device according to an exemplary embodiment of the disclosure.

FIG. 4 is a schematic block diagram of a memory storage device according to an exemplary embodiment of the disclosure. Referring to FIG. 4, the memory storage device 10 includes a connection interface unit 402, a memory control circuit unit 404, and a rewritable non-volatile memory module 406.

The connection interface unit 402 is configured to couple the memory storage device 10 to the host system 11. The memory storage device 10 may communicate with the host system 11 through the connection interface unit 402. According to this exemplary embodiment, the connection interface unit 402 is compatible with Serial Advanced Technology Attachment (SATA) standard. However, it should be noted that the disclosure is not limited thereto. The connection interface unit 402 may also be compliant with Parallel Advanced Technology Attachment (PATA) standard, Institute of Electrical and Electronic Engineers (IEEE) 1394 standard, Peripheral Component Interconnect Express (PCI Express) standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard or other suitable standards. The connection interface unit 402 may be packaged in a chip with the memory control circuit unit 404, or the connection interface unit 402 is disposed outside a chip including the memory control circuit unit 404.

The memory control circuit unit 404 is configured to execute multiple logic gates or control instructions implemented in a hardware type or a firmware type, and to write, read, and erase data in the rewritable non-volatile memory module 406 according to an instruction of the host system 11.

The rewritable non-volatile memory module 406 is coupled to the memory control circuit unit 404 and configured to store data written by the host system 11. The rewritable non-volatile memory module 406 may be a single level cell (SLC) NAND type flash memory module (i.e., a flash memory module that may store 1 bit in a memory cell), a multi-level cell (MLC) NAND type flash memory module (i.e., a flash memory module that may store 2 bits in a memory cell), a triple-level cell (TLC) NAND type flash memory module (i.e., a flash memory module that may store 3 bits in a memory cell), a quad-level cell (QLC) NAND type flash memory module (i.e., a flash memory module that may store 4 bits in a memory cell), other flash memory modules, or other memory modules with the same characteristics.

Each of the memory cell in the rewritable non-volatile memory module 406 stores one or more bits at a change in voltage (hereinafter also referred to as a threshold voltage). Specifically, there is a charge trapping layer between a control gate and a channel of the each of the memory cell. By applying a writing voltage to the control gate, an amount of electrons in the charge trapping layer may be changed, thereby changing the threshold voltage of the memory cell. This operation of changing the threshold voltage of the memory cell is also called "writing data to the memory cell" or "programming the memory cell". As the threshold voltage changes, the each of the memory cell in the rewritable non-volatile memory module 406 has multiple storage states. By applying a reading voltage, it is possible to determine the storage state of a memory cell and obtain one or more bits stored in the memory cell.

According to this exemplary embodiment, the memory cell of the rewritable non-volatile memory module 406 may constitute multiple physical programming units, and the physical programming units may constitute multiple physical erasing units. Specifically, the memory cell on a same word line may form one or more physical programming units. If the each of the memory cell may store more than 2 bits, the physical programming unit on the same word line may be classified as at least a lower physical programming unit and an upper physical programming unit. For example, a least significant bit (LSB) of a memory cell belongs to the lower physical programming unit, and a most significant bit (MSB) of a memory cell belongs to the upper physical programming unit. In general, in the MLC NAND type flash memory, a write speed of the lower physical programming unit is greater than a write speed of the upper physical programming unit, and/or reliability of the lower physical programming unit is higher than reliability of the upper physical programming unit.

According to this exemplary embodiment, the physical programming unit is a smallest unit of programming. That is, the physical programming unit is the smallest unit for writing data. For example, the physical programming unit may be a physical page or a physical sector. If the physical programming unit is a physical page, then the physical programming units may include a data bit region and a redundancy bit region. The data bit region includes multiple physical sectors to store user data, while the redundant bit region is used to store system data (e.g., management data such as error correcting code). According to this exemplary embodiment, the data bit region includes 32 physical sectors, and a size of a physical sector is 512 bytes (B). However, according to other exemplary embodiments, the data bit region may also include 8, 16, or more or less physical sectors, and a size of each of the physical sector may also be larger or smaller. On the other hand, the physical erasing unit is a smallest unit of erasing. That is, each of the physical erasing unit includes a minimum number of erased memory cells. For example, the physical erasing unit is a physical block.

Figure 5:
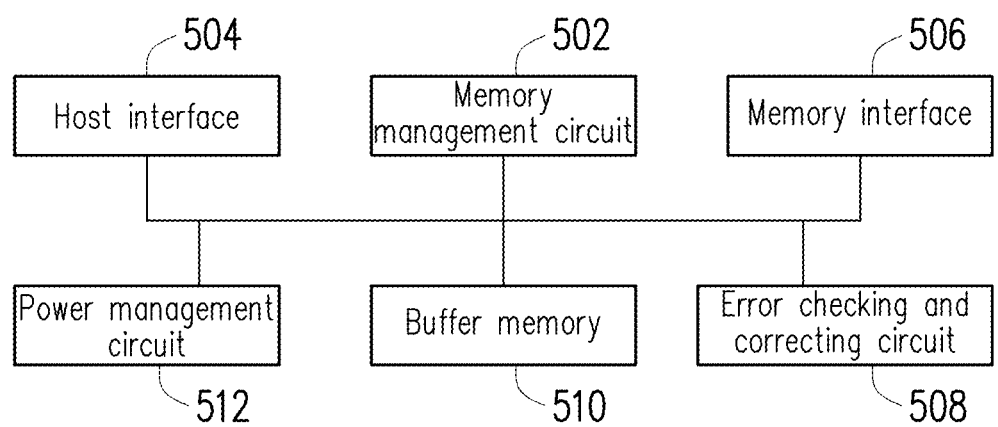
FIG. 5 is a schematic block diagram of a memory control circuit unit according to an exemplary embodiment of the disclosure.

FIG. 5 is a schematic block diagram of a memory control circuit unit according to an exemplary embodiment of the disclosure. Referring to FIG. 5, the memory control circuit unit 404 includes a memory management circuit 502, a host interface 504, and a memory interface 506.

The memory management circuit 502 is configured to control an overall operation of the memory control circuit unit 404. Specifically, the memory management circuit 502 has multiple control instructions, and the control instructions are executed for data writing, reading, and erasing, etc., while the memory storage device 10 is operating. The following description of an operation of the memory management circuit 502 is equivalent to the description of an operation of the memory control circuit unit 404.

According to this exemplary embodiment, the control instructions of the memory management circuit 502 are implemented in a firmware type. For example, the memory management circuit 502 has a microprocessor unit (not shown) and a read only memory (not shown), and the control instructions are programmed into the read only memory. When the memory storage device 10 is operating, the control instructions are executed by the microprocessor unit to write, read, and erase data.

According to another exemplary embodiment, the control instructions of the memory management circuit 502 may also be stored in a specific region of the rewritable non-volatile memory module 406 (e.g., a system region in the memory module dedicated to system data storage) in program code form. In addition, the memory management circuit 502 has a microprocessor unit (not shown), a read only memory (not shown), and a random access memory (not shown). In particular, the read only memory has a boot code, and when the memory control circuit unit 404 is enabled, the microprocessor unit first executes the boot code to load control instructions stored in the rewritable non-volatile memory module 406 into the random access memory of the memory management circuit 502. Then, the microprocessor runs the control instructions to write, read, and erase data.

In addition, according to another exemplary embodiment, the control instructions of the memory management circuit 502 may also be implemented in a hardware type. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cell or a memory cell group of the rewritable non-volatile memory module 406. The memory writing circuit is configured to write data to the rewritable non-volatile memory module 406 by issuing a writing instruction sequence to the rewritable non-volatile memory module 406. The memory reading circuit is configured to read data from the rewritable non-volatile memory module 406 by issuing a reading instruction sequence to the rewritable non-volatile memory module 406 to. The memory erasing circuit is configured to erase data from the rewritable non-volatile memory module 406 by issuing an erasing instruction sequence to the rewritable non-volatile memory module 406. The data processing circuit is configured to process data to be written into the rewritable non-volatile memory module 406 and data read from the rewritable non-volatile memory module 406. The writing instruction sequence, the reading instruction sequence, and the erasing instruction sequence may each include one or more program codes or instruction codes and are used to instruct the rewritable non-volatile memory module 406 to perform corresponding writing, reading, and erasing operations. According to an exemplary embodiment, the memory management circuit 502 may also issue other types of instruction sequences to the rewritable non-volatile memory module 406 to instruct corresponding operations to be performed.

The host interface 504 is coupled to the memory management circuit 502. The memory management circuit 502 may communicate with the host system 11 through the host interface 504. The host interface 504 may be configured to receive and identify instructions and data transmitted by the host system 11. For example, the instructions and the data transmitted by the host system 11 may be transmitted to the memory management circuit 502 through the host interface 504. In addition, the memory management circuit 502 may transmit data to the host system 11 through the host interface 504. According to this exemplary embodiment, the host interface 504 is compatible with SATA standard. However, it should be noted that the disclosure is not limited thereto. The host interface 504 may also be compatible with PATA standard, IEEE 1394 standard, PCI Express standard, USB standard, SD standard, UHS-I standard, UHS-II standard, MS standard, MMC standard, eMMC standard, UFS standard, CF standard, IDE standard or other suitable data transmitting standards.

The memory interface 506 is coupled to the memory management circuit 502 and configured to access the rewritable non-volatile memory module 406. In other words, the data to be written into the rewritable non-volatile memory module 406 is converted through the memory interface 506 to a format acceptable to the rewritable non-volatile memory module 406. Specifically, if the memory management circuit 502 is to access the rewritable non-volatile memory module 406, the memory interface 506 transmits corresponding instruction sequences. For example, the instruction sequences may include a writing instruction sequence instructing to write data, a reading instruction sequence instructing to read data, an erasing instruction sequence instructing to erase data, and corresponding instruction sequences to instruct various memory operations (e.g., changing read voltage levels or performing garbage collection operations, etc.). The instruction sequences are, for example, generated by the memory management circuit 502 and transmitted to the rewritable non-volatile memory module 406 through the memory interface 506. The instruction sequences may include one or more signals, or data on a bus. The signals or data may include instruction codes or program codes. For example, in the reading instruction sequence, information such as a read identifier and a memory address will be included.

According to an exemplary embodiment, the memory control circuit unit 404 further includes an error checking and correcting circuit 508, a buffer memory 510, and a power management circuit 512.

The error checking and correcting circuit 508 is coupled to the memory management circuit 502 and configured to perform error checking and correcting operations to ensure data correctness. Specifically, when the memory management circuit 502 receives a writing instruction from the host system 11, the error checking and correcting circuit 508 generates a corresponding error correcting code (ECC) and/or error detecting code (EDC) for data corresponding to the writing instruction, and the memory management circuit 502 writes data corresponding to the writing instruction and the corresponding error correcting code and/or error detecting code to the rewritable non-volatile memory module 406. Then, when the memory management circuit 502 reads data from the rewritable non-volatile memory module 406, the memory management circuit 502 also reads an error correcting code and/or error detecting code corresponding to the data at the same time, and the error checking and correcting circuit 508 perform error checking and correcting operations on the read data based on the error correcting code and/or error detecting code.

The buffer memory 510 is coupled to the memory management circuit 502 and configured to temporarily store data and instructions from the host system 11 or data from the rewritable non-volatile memory module 406. The buffer memory 510 may be a static random access memory (SRAM), or a dynamic random access memory (DRAM), etc., and the disclosure is not limited thereto. The power management circuit 512 is coupled to the memory management circuit 502 and configured to control power of the memory storage device 10.

According to an exemplary embodiment, the rewritable non-volatile memory module 406 of FIG. 4 is also called a flash memory module, and the memory control circuit unit 404 is also called a flash memory controller for controlling the flash memory module. According to an exemplary embodiment, the memory management circuit 502 of FIG. 5 is also called a flash memory management circuit.

Figure 6:
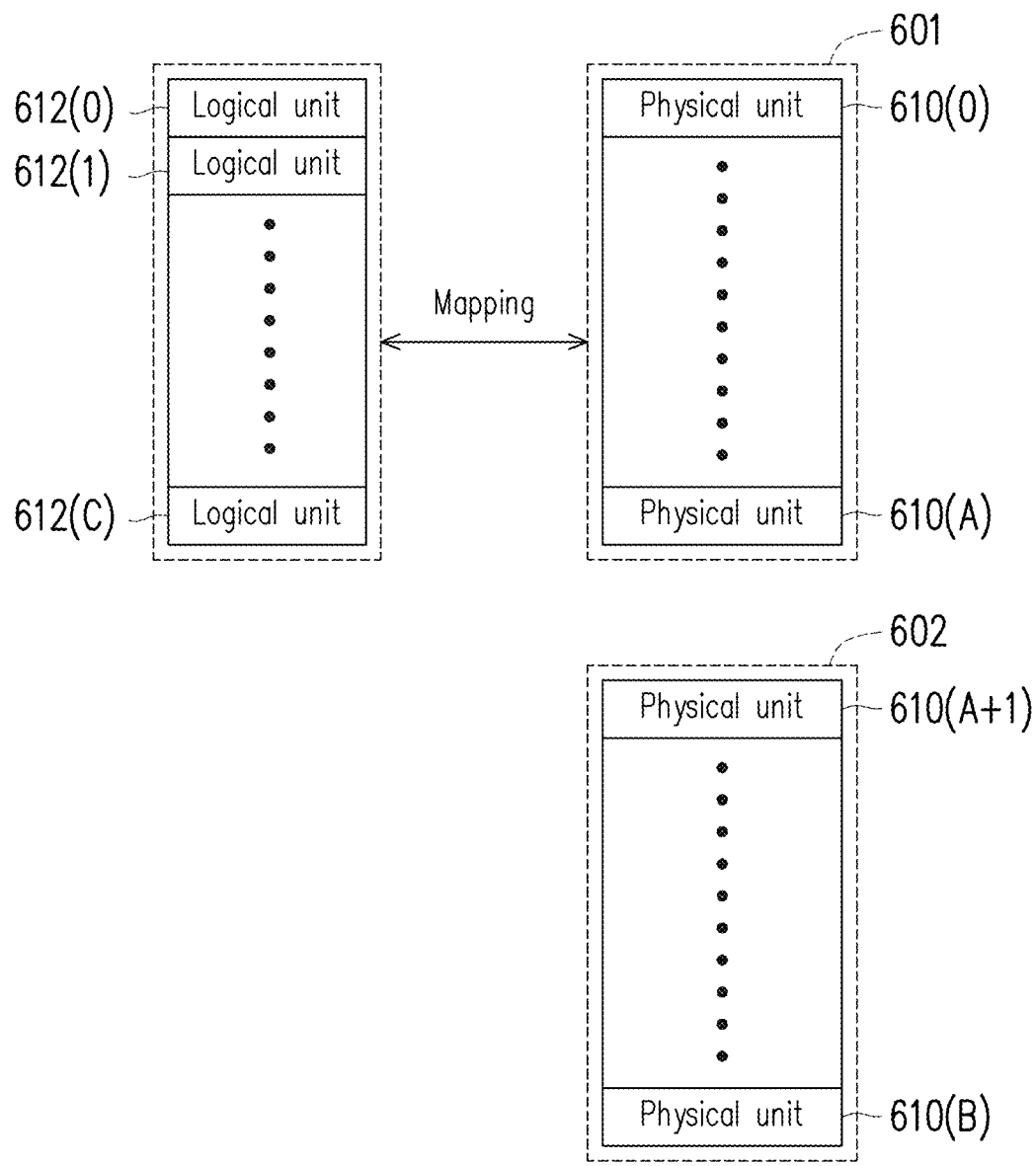
FIG. 6 is a schematic diagram of managing a rewritable non-volatile memory module according to an exemplary embodiment of the disclosure.

FIG. 6 is a schematic diagram of managing a rewritable non-volatile memory module according to an exemplary embodiment of the disclosure. Referring to FIG. 6, the memory management circuit 502 may logically group physical units 610(0) to 610(B) of the rewritable non-volatile memory module 406 into a storage region 601 and an idle region 602. The physical units 610(0) to 610(A) in the storage region 601 and the physical units 610(A+1) to 610(B) in the idle region 602 are configured to store data from the host system 11. Specifically, the physical units of the storage region 601 are considered to be physical units having stored data, while the physical units of the idle region 602 are configured to replace the physical units of the storage region 601. That is to say, when receiving the writing instruction and data to be written from the host system 11, the memory management circuit 502 uses the physical units from the idle region 602 to write the data to replace the physical units in the storage region 601.

According to this exemplary embodiment, each of the physical units refers to a physical erasing unit. However, according to another exemplary embodiment, a physical unit may also refer to a physical address, a physical programming unit, or consist of multiple continuous or discontinuous physical addresses. The memory management circuit 502 configures logical units 612(0) to 612(C) to map the physical units 610(0) to 610(A) in the storage region 601. According to this exemplary embodiment, each of the logical units refers to a logical address. However, according to another exemplary embodiment, a logic unit may also refer to a logic programming unit, a logic erasing unit, or consist of multiple continuous or discontinuous logic addresses. In addition, each of the logical units 612(0) to 612(C) may be mapped to one or more physical units.

The memory management circuit 502 may record a mapping relationship between the logical unit and the physical unit (also called a logical-physical address mapping relationship) in at least one logical-physical address mapping table. When the host system 11 intends to read data from the memory storage device 10 or write data to the memory storage device 10, the memory management circuit 502 may perform data access operations to the memory storage device 10 according to the logical-physical address mapping table.

By default, the memory storage device 10 is operating in an active mode. In the active mode, the memory management circuit 502 may receive instructions from the host system 11 to perform operations such as data reading, data writing, or data erasing. For example, according to a reading instruction from the host system 11, the memory management circuit 502 may read data requested by the host system 11 from the rewritable non-volatile memory module 406. Alternatively, according to a writing instruction from the host system 11, the memory management circuit 502 may write data from the host system 11 to the rewritable non-volatile memory module 406. Or, according to an erasing instruction from the host system 11, the memory management circuit 502 may erase data instructed by the host system 11 from the rewritable non-volatile memory module 406.

In some cases, the memory management circuit 502 may instruct the memory storage device 10 to enter the background mode. In the background mode, the memory management circuit 502 may perform the background operation. In general, the background operation does not include the operations instructed by the host system 11. For example, the background operation may include various management operations performed autonomously by the memory management circuit 502, including a data consolidation operation for releasing idle physical units (also called garbage collection operations), a wear leveling operation for extending life of the memory storage device 10 and/or a table update operation for updating system information (or management information), etc. In addition, after entering the background mode, the memory management circuit 502 may instruct the memory storage device 10 to leave the background mode and enter the active mode to process instructions from the host system 11. On the other hand, after performing the background operation, the memory management circuit 502 may instruct the memory storage device 10 to leave the background mode and enter the low electricity consumption mode.

According to an exemplary embodiment, the memory management circuit 502 may determine whether a condition for performing the background operation is met according to a current state of the memory storage device 10. In response to a determination that the condition for performing the background operation is met, the memory management circuit 502 may instruct the memory storage device 10 to enter the background mode. For example, when the memory storage device 10 is idle for a period of time (e.g., no instruction is received from the host system 11 at a preset time) or when a number of the physical units in the idle region 602 is less than a preset threshold, the memory management circuit 502 performs a data consolidation operation on valid data in the storage region 601 to release empty physical units. In addition, a wear leveling operation, a table update operation, or other background operations have their corresponding execution conditions, and will not be repeated in the following.

In some cases, the memory management circuit 502 may instruct the memory storage device 10 to enter the low electricity consumption mode. In the low electricity consumption mode, the memory management circuit 502 may not perform any operations or the background operation instructed by the host system 11. According to an exemplary embodiment, the low electricity consumption mode may be set to multiple levels, with different levels of the low electricity consumption mode limiting operations of various components in the memory storage device 10.

For example, the low electricity consumption mode is assumed to be set to two levels, including a first low electricity consumption mode and a second low electricity consumption mode. When the low electricity consumption mode entered by the memory storage device 10 is the first low electricity consumption mode, the memory management circuit 502 may disconnect power of the rewritable non-volatile memory module 406 and store only necessary data such as codes for firmware operation and necessary mapping tables, in the buffer memory 510. Specifically, when the memory storage device 10 enters the first low electricity consumption mode, the memory management circuit 502 may store back to the rewritable non-volatile memory module 406 a program code and data other than a logical-physical address mapping table temporarily stored in the buffer memory, and disconnect the power of the rewritable non-volatile memory module 406. In other words, in the first low electricity consumption mode, the memory management circuit 502 does not disconnect power of the buffer memory 510, and the buffer memory 510 may still store necessary data. Herein, when an instruction from the host system 11 is received in the first low electricity consumption mode, the memory management circuit may quickly respond to a host instruction.

When the low electricity consumption mode entered by the memory storage device 10 is the second low electricity consumption mode, the memory management circuit 502 may disconnect the power of the rewritable non-volatile memory module 406 and the buffer memory 510, thereby entering a most power-efficient mode to reduce power consumption. Specifically, when the memory storage device 10 enters the second low electricity consumption mode, the memory management circuit 502 may store back to the rewritable non-volatile memory module 406 all data temporarily stored in the buffer memory 510, and disconnect the power of the rewritable non-volatile memory module 406 and the buffer memory 510.

According to an exemplary embodiment, electricity consumption of the memory storage device 10 in the second low electricity consumption mode is lower than electricity consumption of the memory storage device 10 in the first low electricity consumption mode. Herein, power consumption of the memory storage device 10 in the second low electricity consumption mode is lower than power consumption of the memory storage device 10 in the first low electricity consumption mode.

Figure 7:
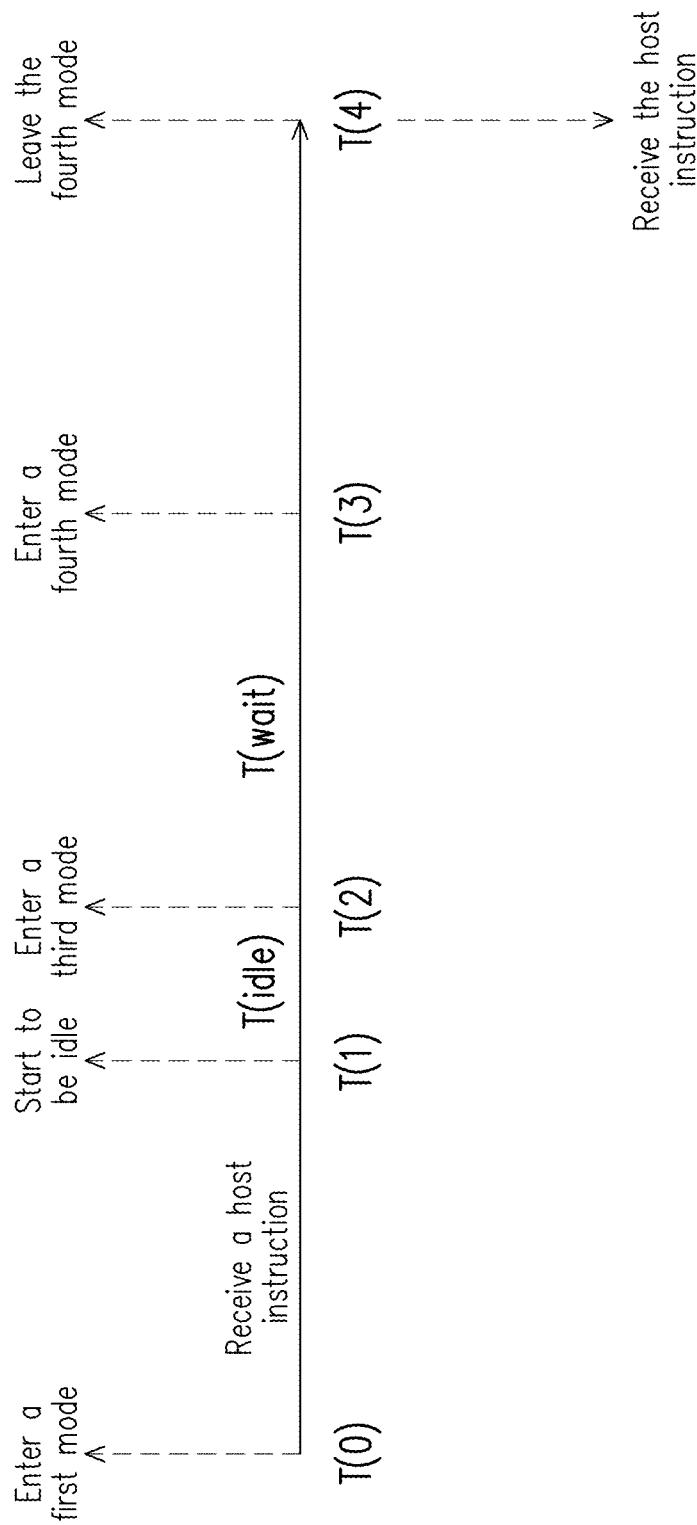
FIG. 7 is a schematic diagram of controlling an operation mode of a memory storage device according to an exemplary embodiment of the disclosure.

In the following exemplary embodiments, the active mode is also referred to as a first mode, the background mode is also referred to as a second mode, the first low electricity consumption mode is also referred to as a third mode, and the second low electricity consumption mode is also referred to as a fourth mode for the sake of illustration. FIG. 7 is a schematic diagram of controlling an operation mode of a memory storage device according to an exemplary embodiment of the disclosure. Referring to FIG. 7, the memory storage device 10 is assumed to be operating in the first mode at a time point T(0). In the first mode, the memory storage device 10 may execute the host instruction, and the memory management circuit 502 may count an idle time of the memory storage device 10 after executing the host instruction.

According to this exemplary embodiment, the rewritable non-volatile memory module 406 is assumed to complete an operation instructed by a last instruction from the host system 11 at a time point T(1). In this situation, the memory storage device 10 starts to be idle at the time point T(1). In response to the memory storage device 10 starting to be idle, the memory management circuit 502 may count an idle time T of the memory storage device 10 starting from the time point T(1). Then, the memory management circuit 502 may continuously determine whether the idle time T is greater than a preset idle threshold, and instruct the memory storage device 10 to enter the third mode from the first mode when the idle time T is determined to be greater than the idle threshold.

According to this exemplary embodiment, the memory management circuit 502 is assumed to determine that the idle time T is greater than the idle threshold at a time point T(2). In response to this determination result, after the time point T(2), the memory management circuit 502 instructs the memory storage device 10 to leave the first mode and enter the third mode. In this situation, the memory storage device 10 starts to enter a first level of the low electricity consumption mode at the time point T(2). In the third mode, the memory management circuit 502 may count a waiting time T (i.e., a first waiting time) of the memory storage device 10 from the time point T(2). Then, the memory management circuit 502 may continuously determine whether the waiting time T is greater than a preset waiting threshold (i.e., a first waiting threshold), and instruct the memory storage device 10 to enter the fourth mode from the third mode when determining that the waiting time T is greater than the first waiting threshold.

According to this exemplary embodiment, the memory management circuit 502 is assumed to determine that the waiting time T is greater than the first waiting threshold at a time point T(3). In response to this determination result, after the time point T(3), the memory management circuit 502 instructs the memory storage device 10 to leave the third mode and enter the fourth mode. In this situation, the memory storage device 10 starts to enter a second level of the low electricity consumption mode at the time point T(2). Electricity consumption of the fourth mode is lower than electricity consumption of the third mode. After entering the fourth mode, the memory management circuit 502 is assumed to receive a new instruction (e.g., a writing instruction) from the host system 11 at a time point T(4). In response to the new instruction, after the time point T(4), the memory management circuit 502 may instruct the memory storage device 10 to leave the fourth mode and enter the first mode. In the first mode, the memory management circuit 502 may instruct the rewritable non-volatile memory module 406 to perform an operation (e.g., a writing operation) instructed by the new instruction.

It should be noted that, according to the exemplary embodiment of FIG. 7, time points of entering the third mode and the fourth mode (i.e., the time points T(2) and T(3)) are determined autonomously by the memory management circuit 502, while a time point of leaving the fourth mode (i.e., the time point T(4)) is determined by a time point at which a next host instruction is received. In other words, the memory management circuit 502 has control over a decision of the time point T(2) and the time point T(3) in FIG. 7, but not over a decision of the time point T(4).

Figure 8:
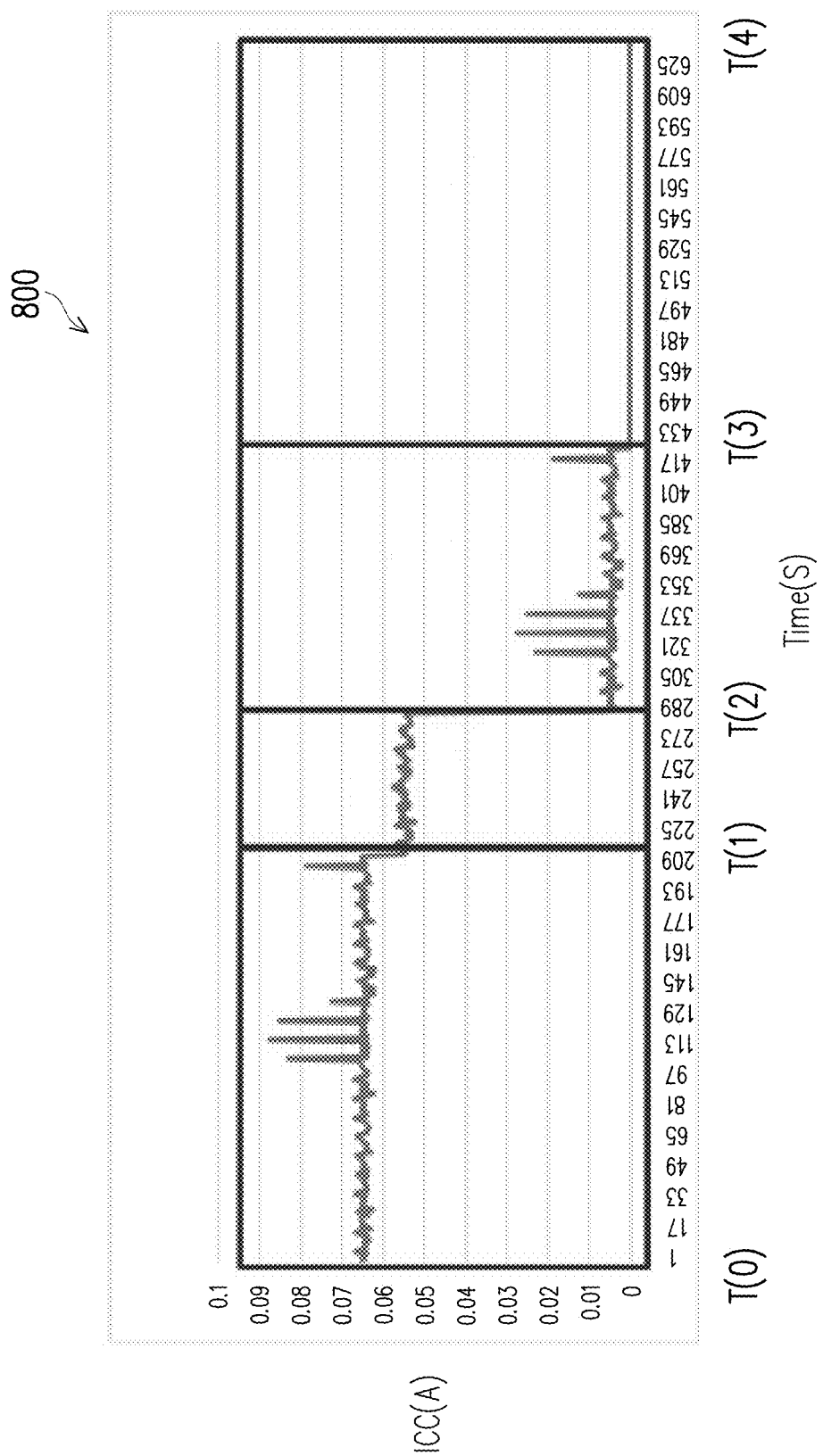
FIG. 8 is a diagram showing relationship between an operating current value of a memory storage device and multiple modes according to an exemplary embodiment of the disclosure.

FIG. 8 is a diagram showing relationship between an operating current value of a memory storage device and multiple modes according to an exemplary embodiment of the disclosure. Referring to a relationship diagram 800 in FIG. 8 corresponding to FIG. 7, the operating current value of the fourth mode between the time point T(3) to the time point T(4) is lower than the operating current value of the third mode between the time point T(2) and the time point T(3).

Figure 9:
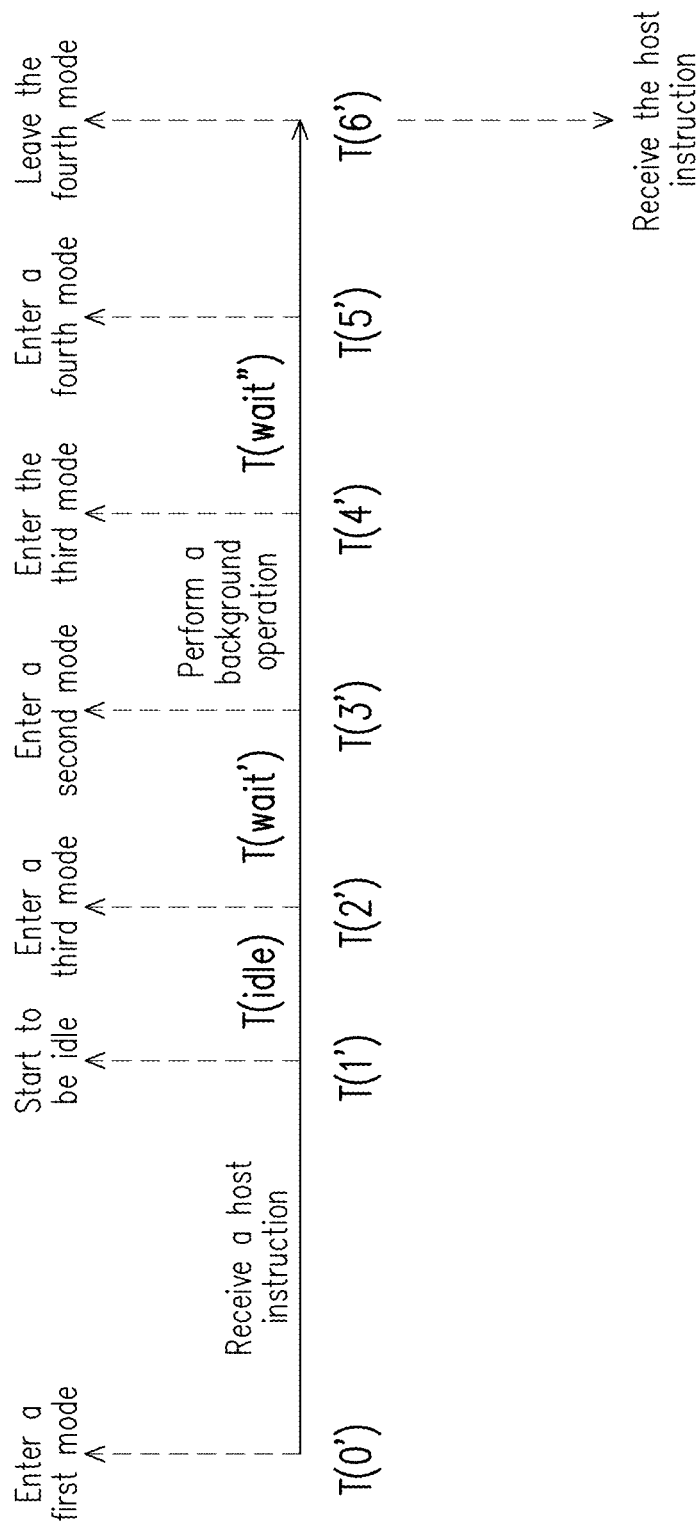
FIG. 9 is a schematic diagram of controlling an operation mode of a memory storage device according to an exemplary embodiment of the disclosure.

FIG. 9 is a schematic diagram of controlling an operation mode of a memory storage device according to an exemplary embodiment of the disclosure. Referring to FIG. 9, the memory storage device 10 is assumed to be operating in the first mode at a time point T(0'). In the first mode, the memory storage device 10 may execute the host instruction, and the memory management circuit 502 may count the idle time of the memory storage device 10 after executing the host instruction.

According to this exemplary embodiment, the rewritable non-volatile memory module 406 is assumed to complete the operation instructed by the last instruction from the host system 11 at a time point T(1'). In this situation, the memory storage device 10 starts to be idle at the time point T(1'). In response to the memory storage device 10 starting to be idle, the memory management circuit 502 may count the idle time T of the memory storage device 10 starting from the time point T(1'). Then, the memory management circuit 502 may continuously determine whether the idle time T is greater than the preset idle threshold, and instruct the memory storage device 10 to enter the third mode from the first mode when the idle time T is determined to be greater than the idle threshold.

However, the memory management circuit 502 may instruct the memory storage device 10 to enter the second mode at a specific time (e.g., when no host instruction needs to be processed) when the condition for performing the background operation is met. For example, the memory management circuit 502 may determine in the first mode whether the condition for performing the background operation is met.

According to this exemplary embodiment, the memory management circuit 502 is assumed to determine that the idle time T is greater than the idle threshold at a time point T(2'). In response to this determination result, after the time point T(2'), the memory management circuit 502 instructs the memory storage device 10 to leave the first mode and enter the third mode. In this situation, the memory storage device 10 starts to enter the first level of the low electricity consumption mode at the time point T (2'). In the third mode, the memory management circuit 502 may count a waiting time T(wait') (i.e., a second waiting time) of the memory storage device 10 starting from the time point T(2'). Then, in response to a state of the memory storage device 10 being determined to meet the condition for performing the background operation, the memory management circuit 502 may continuously determine whether the waiting time T(wait') is greater than the preset waiting threshold (i.e., a second waiting threshold), and instruct the memory storage device 10 to enter the fourth mode from the third mode when the waiting time T(wait') is determined to be greater than the waiting threshold. According to an exemplary embodiment, the second waiting threshold may be different from the first waiting threshold of the preceding embodiment, and the disclosure is not limited thereto. For example, the second waiting threshold may be less than the first waiting threshold.

It should be noted that according to this exemplary embodiment, when it is determined that the background operation needs to be performed, the first level of the low electricity consumption mode is first entered to continue to wait for the host instruction, which is more power-efficient than a general idle for a long time waiting for the host instruction and then directly enter the background mode.

According to this exemplary embodiment, the memory management circuit 502 is assumed to instruct the memory storage device 10 to enter the second mode at a time point T(3'). In the second mode, the memory management circuit 502 performs the background operation. In this situation, the waiting time T(wait') is not greater than the second waiting threshold. According to this exemplary embodiment, the memory management circuit 502 is assumed to complete the background operation at a time point T(4'). After the memory storage device 10 performs the background operation, the memory management circuit 502 instructs the memory storage device 10 to leave the second mode and enter the third mode, and count a waiting time T(wait") (also called a third waiting time) of the memory storage device 10 in the third mode. For example, the memory management circuit 502 starts counting the waiting time T (wait") of the memory storage device 10 from the time point T (4'). Then, the memory management circuit 502 may continuously determine whether the waiting time T(wait") is greater than the preset waiting threshold (i.e., a third waiting threshold), and instruct the memory storage device 10 to enter the fourth mode from the third mode when the waiting time T(wait") is determined to be greater than the waiting threshold. According to an exemplary embodiment, the third waiting threshold may be different from the first waiting threshold or the second waiting threshold, and the disclosure is not limited thereto. For example, the memory management circuit 502 may count the third waiting threshold according to the first waiting threshold and the second waiting threshold. For example, the third waiting threshold is equal to the first waiting threshold minus the second waiting threshold.

According to this exemplary embodiment, the memory management circuit 502 is assumed to determine that the waiting time T(wait") is greater than the third waiting threshold at a time point T(5'). In response to this determination result, after the time point T(5'), the memory management circuit 502 instructs the memory storage device 10 to leave the third mode and enter the fourth mode. In this situation, the memory storage device 10 starts to enter the second level of the low electricity consumption mode at the time point T (5'). Electricity consumption of the fourth mode is lower than electricity consumption of the third mode. After entering the fourth mode, the memory management circuit 502 is assumed to receive a new instruction (e.g., a writing instruction) from the host system 11 at a time point T(6'). In response to the new instruction, after the time point T(6'), the memory management circuit 502 may instruct the memory storage device 10 to leave the fourth mode and enter the first mode. In the first mode, the memory management circuit 502 may instruct the rewritable non-volatile memory module 406 to perform an operation (e.g., a writing operation) instructed by the new instruction.

It should be noted that according to the exemplary embodiment of FIG. 9, time points of entering the second mode, the third mode, and the fourth mode (i.e., the time points T(2'), T(3'), T(4'), and T (5')) are determined autonomously by the memory management circuit 502, while a time point of leaving the fourth mode (i.e., the time point T(6')) is determined by a time point at which a next host instruction is received. In other words, the memory management circuit 502 has control over a decision of the time points T(2'), T(3'), T(4'), and T (5') in FIG. 7, but not over a decision of the time point T(6').

Figure 10:
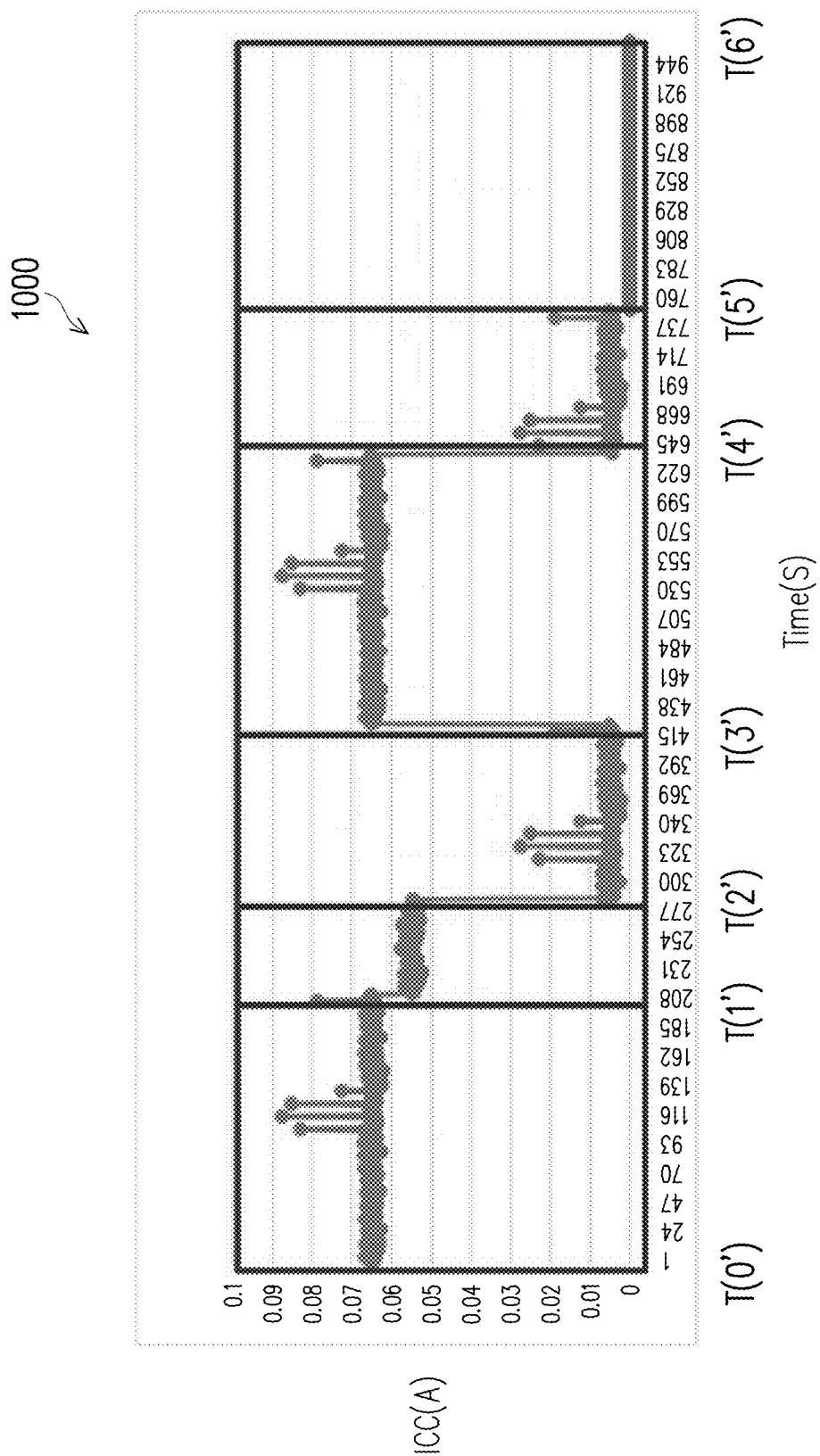
FIG. 10 is a diagram showing relationship between an operating current value of a memory storage device and multiple modes according to an exemplary embodiment of the disclosure.

FIG. 10 is a diagram showing relationship between an operating current value of a memory storage device and multiple modes according to an exemplary embodiment of the disclosure. Referring to the relationship diagram 800 in FIG. 8 corresponding to FIG. 7 and a relationship diagram 1000 in FIG. 10 corresponding to FIG. 9, the waiting time T(wait) between the time point T(2) and the time point T(3) in FIG. 8 is equal to a sum of the waiting time T(wait') between the time point T(2') and the time point T(3') and the waiting time T(wait") between the time point T(4') and the time point T(5') in FIG. 10.

According to an exemplary embodiment, if a new instruction is received from the host system 11 in the second mode, the third mode, or the fourth mode, the memory management circuit 502 may recount the idle time when starting to be idle, i.e., return to the time point T(0) of FIG. 7 or the time point T (0') of FIG. 9 and determine again according to the conditions of the preceding exemplary embodiments.

Figure 11:
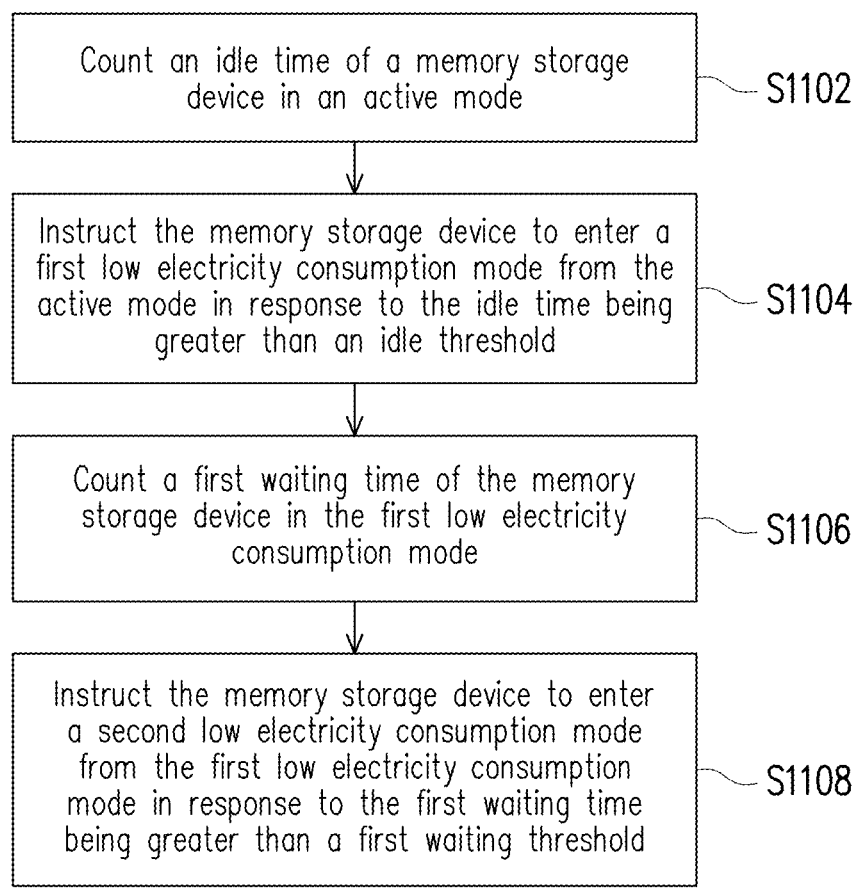
FIG. 11 is a flow chart of a memory performance optimization method according to an exemplary embodiment of the disclosure.

FIG. 11 is a flow chart of a memory performance optimization method according to an exemplary embodiment of the disclosure. Referring to FIG. 11, in step S1102, in an active mode, an idle time of a memory storage device is counted. In step S1104, in response to the idle time being greater than an idle threshold, the memory storage device is instructed to enter a first low electricity consumption mode from the active mode. In step S1106, in the first low electricity consumption mode, a first waiting time of the memory storage device is counted. In step S1108, in response to the first waiting time being greater than a first waiting threshold, the memory storage device is instructed to enter a second low electricity consumption mode from the first low electricity consumption mode.

Each of the steps in FIG. 11 is described in detail and therefore will not be repeated in the following. It should be noted that the each of the steps in FIG. 11 may be implemented as multiple program codes or circuits, and the disclosure is not limited thereto. In addition, the method of FIG. 11 may be used with the exemplary embodiments or alone, and the disclosure is not limited thereto.

In summary, the memory performance optimization method, the memory control circuit unit, and the memory storage device provided by the embodiments of the disclosure are configured with low electricity consumption modes with different electricity consumption. In a first level of the low electricity consumption mode, the buffer memory still temporarily holds necessary data and may respond quickly to host requirements while reducing power consumption of the memory storage device. In a second level of the low electricity consumption mode, the memory storage device consumes less power and may be more energy efficient. Based on different levels of low electricity consumption mode, the memory storage device may better balance power savings with system performance. In addition, when the memory storage device according to the embodiments of the disclosure determines that the background operation needs to be performed, the memory storage device first enters the first level of the low electricity consumption mode to continue to wait for the host instruction, which is more power-efficient than a general idle for a long time waiting for the host instruction and then directly enter the background mode.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A memory performance optimization method for a memory storage device, the memory storage device comprising a memory control circuit unit and a rewritable non-volatile memory module, the memory control circuit unit comprising a buffer memory, and the method comprising:
   counting an idle time of the memory storage device in an active mode;
   instructing the memory storage device to enter a first low electricity consumption mode from the active mode in response to the idle time being greater than an idle threshold;
   counting a first waiting time of the memory storage device in the first low electricity consumption mode;
   instructing the memory storage device to enter a second low electricity consumption mode from the first low electricity consumption mode in response to the first waiting time being greater than a first waiting threshold, wherein electricity consumption of the second low electricity consumption mode is lower than electricity consumption of the first low electricity consumption mode;
   counting a second waiting time of the memory storage device in the first low electricity consumption mode in response to a condition for performing a background operation being met;
   instructing the memory storage device to enter a background mode from the first low electricity consumption mode in response to the second waiting time being greater than a second waiting threshold;
   instructing the memory storage device to enter the first low electricity consumption mode from the background mode after the background operation being performed, and counting a third waiting time of the memory storage device in the first low electricity consumption mode; and
   instructing the memory storage device to enter the second low electricity consumption mode from the first low electricity consumption mode in response to the third waiting time being greater than a third waiting threshold, wherein the third waiting threshold is equal to the first waiting threshold minus the second waiting threshold.

2. The memory performance optimization method according to claim 1, wherein instructing the memory storage device to enter the first low electricity consumption mode from the active mode comprises:
   storing back to the rewritable non-volatile memory module a program code and data other than a logical-physical address mapping table temporarily stored in the buffer memory, and disconnecting power of the rewritable non-volatile memory module.

3. The memory performance optimization method according to claim 1, wherein instructing the memory storage device to enter the second low electricity consumption mode from the first low electricity consumption mode comprises:
   storing back to the rewritable non-volatile memory module all data temporarily stored in the buffer memory, and disconnecting power of the rewritable non-volatile memory module and the buffer memory.

4. The memory performance optimization method according to claim 1, wherein the second waiting threshold is less than the first waiting threshold.

5. A memory control circuit unit for controlling a memory storage device comprising a rewritable non-volatile memory module, wherein the memory control circuit unit comprises:
   a host interface configured to couple to a host system;
   a memory interface configured to couple to the rewritable non-volatile memory module;
   a buffer memory; and
   a memory management circuit coupled to the host interface, the memory interface, and the buffer memory,
   wherein the memory management circuit is configured to count an idle time of the memory storage device in an active mode,
   the memory management circuit is further configured to instruct the memory storage device to enter a first low electricity consumption mode from the active mode in response to the idle time being greater than an idle threshold,
   the memory management circuit is further configured to count a first waiting time of the memory storage device in the first low electricity consumption mode,
   the memory management circuit is further configured to instruct the memory storage device to enter a second low electricity consumption mode from the first low electricity consumption mode in response to the first waiting time being greater than a first waiting threshold, wherein electricity consumption of the second low electricity consumption mode is lower than electricity consumption of the first low electricity consumption mode,
   the memory management circuit is further configured to:
   count a second waiting time of the memory storage device in the first low electricity consumption mode in response to a condition for performing a background operation being met;
   instruct the memory storage device to enter a background mode from the first low electricity consumption mode in response to the second waiting time being greater than a second waiting threshold;
   instruct the memory storage device to enter the first low electricity consumption mode from the background mode after the background operation being performed, and count a third waiting time of the memory storage device in the first low electricity consumption mode; and
   instruct the memory storage device to enter the second low electricity consumption mode from the first low electricity consumption mode in response to the third waiting time being greater than a third waiting threshold, wherein the third waiting threshold is equal to the first waiting threshold minus the second waiting threshold.

6. The memory control circuit unit according to claim 5, wherein in an operation of instructing the memory storage device to enter the first low electricity consumption mode from the active mode,
   the memory management circuit is further configured to store back to the rewritable non-volatile memory module a program code and data other than a logical-physical address mapping table temporarily stored in the buffer memory, and disconnect power of the rewritable non-volatile memory module.

7. The memory control circuit unit according to claim 5, wherein in an operation of instructing the memory storage device to enter the second low electricity consumption mode from the first low electricity consumption mode, the memory management circuit is further configured to store back to the rewritable non-volatile memory module all data temporarily stored in the buffer memory, and disconnect power of the rewritable non-volatile memory module and the buffer memory.

8. The memory control circuit unit according to claim 5, wherein the second waiting threshold is less than the first waiting threshold.

9. A memory storage device comprising:
- a connection interface unit configured to couple to a host system;
- a rewritable non-volatile memory module; and
- a memory control circuit unit coupled to the connection interface unit and the rewritable non-volatile memory module, wherein the memory control circuit unit comprises a buffer memory, wherein the memory control circuit unit is configured to count an idle time of the memory storage device in an active mode, the memory control circuit unit is further configured to instruct the memory storage device to enter a first low electricity consumption mode from the active mode in response to the idle time being greater than an idle threshold, the memory control circuit unit is further configured to count a first waiting time of the memory storage device in the first low electricity consumption mode, the memory control circuit unit is further configured to instruct the memory storage device to enter a second low electricity consumption mode from the first low electricity consumption mode in response to the first waiting time being greater than a first waiting threshold, wherein electricity consumption of the second low electricity consumption mode is lower than electricity consumption of the first low electricity consumption mode, the memory control circuit unit is further configured to:
count a second waiting time of the memory storage device in the first low electricity consumption mode in response to a condition for performing a background operation being met;

instruct the memory storage device to enter a background mode from the first low electricity consumption mode in response to the second waiting time being greater than a second waiting threshold;

instruct the memory storage device to enter the first low electricity consumption mode from the background mode after the background operation being performed, and count a third waiting time of the memory storage device in the first low electricity consumption mode; and instruct the memory storage device to enter the second low electricity consumption mode from the first low electricity consumption mode in response to the third waiting time being greater than a third waiting threshold, wherein the third waiting threshold is equal to the first waiting threshold minus the second waiting threshold.

10. The memory storage device according to claim 9, wherein in an operation of instructing the memory storage device to enter the first low electricity consumption mode from the active mode, the memory control circuit unit is further configured to store back to the rewritable non-volatile memory module a program code and data other than a logical-physical address mapping table temporarily stored in the buffer memory, and disconnect power of the rewritable non-volatile memory module.

11. The memory storage device according to claim 9, wherein in an operation of instructing the memory storage device to enter the second low electricity consumption mode from the first low electricity consumption mode, the memory control circuit unit is further configured to store back to the rewritable non-volatile memory module all data temporarily stored in the buffer memory, and disconnect power of the rewritable non-volatile memory module and the buffer memory.

12. The memory storage device according to claim 9, wherein the second waiting threshold is less than the first waiting threshold.

* * * * *